Figure 1:
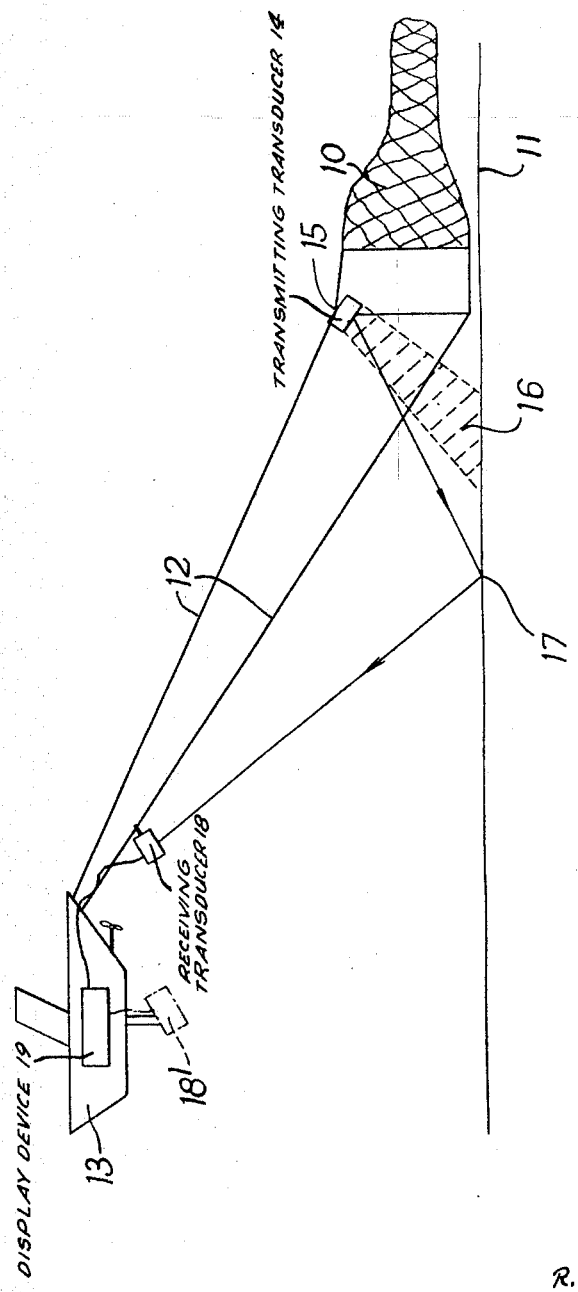

United States Patent Office 3,297,980
Patented Jan. 10, 1967

3,297,980
ECHO-SOUNDING APPARATUS FOR
TRAWL FISHING
Roy William George Haslett, London, England, assignor to S. Smith & Sons (England) Limited, London, England, a British company
Filed Dec. 3, 1963, Ser. No. 327,737
Claims priority, application Great Britain, Dec. 5, 1962, 45,991/62
4 Claims. (Cl. 340—3)

The present invention relates to fish detection echo-sounding apparatus for trawl fishing and methods of detecting fish by echo-sounding.

In echo sounding apparatus at present in use the fishing vessel carries a transmitting transducer for generating a sounding beam of pulsed alternating pressure wave energy at ultrasonic or higher sonic frequencies and a receiving transducer to receive echoes of the sounding beam from the sea-bed and from fish, along with various amplifications and display apparatus. In some cases a single transducer may be used for transmission and reception.

The region through which the trawl is drawn is usually that immediately above the sea-bed and consequently only the echoes from a range of depths immediately above the sea-bed are of interest. The transmission of the sounding beam and the echoes through the region between the vessel and the range of depths of interest results in attenuation and scattering of energy which cause very large losses when, as is frequently the case, the depth of this region is many times greater than the depth range of interest, which may, for example, be 1½ fathoms in 200 fathoms. Also the divergence of the beam results in a width at the depth of the trawl which may be equal to or greater than the width of the trawl mouth, with the result that echoes are received simultaneously from fish at different depths and may be received from fish which do not lie in the path of the trawl. The electrical equipment in the vessel can be modified to overcome many of these difficulties but only at the expense of increasing its complexity and bulk, both of which are undesirable in equipment intended for use on a fishing vessel in all weathers.

It has been proposed, in order to overcome some of these difficulties, to transfer the transmitting and receiving transducers to the trawl and to connect them to the vessel by a cable serving to feed electrical pulse signals to the transmitting transducer for the generation of the sounding beam and to pass electrical echo signals from the reeciving transducer to the amplification and display equipment in the vessel. Such a cable, however, requires the provision of special electrical connections to the apparatus on board the vessel, and greatly increases the difficulty of handling the trawl and its drag lines, especially in rough weather.

In accordance with the present invention there is provided a method of echo-sounding to detect fish when trawling wherein a pulsed sounding beam is transmitted from a transmitting device on the trawl downwards and forwards in front of the trawl mouth and echo signals are received by a receiving transducer connected to a display device on the ship and arranged to face towards the trawl to receive echoes of the sounding beam.

The invention also provides fish detection echo-sounding apparatus for use in trawl fishing including a transmitting device capable of generating a sounding beam of pulsed pressure wave energy, attached to the trawl and arranged to direct the beam downwards and forwards in front of the trawl mouth, a receiving transducer attached to the trawler and positioned to receive echoes of the sounding beam from fish in front of the trawl mouth, and a display device on the trawler connected to the receiving transducer to display the received echoes.

Because of the smaller power required by a transmitting device which is attached to the trawl the device may be self-contained in the sense that it does not require connection to any external source of power to ensure its operation and in particular does not require an electrical connection to the trawler. In comparison with a normal echo-sounder the loss of energy during passage of the beam through the sea from the transmitting device to the fish is greatly reduced by placing the transmitter close to the region to be investigated. Because of this, the transmitter requires much less power and can be energized by batteries. The transmitting device may thus consist of a transmitting transducer, a simple pulse generating circuit combined with a circuit to determine the pulse recurrence interval, and batteries, all contained in a small watertight casing attached to the trawl and provided with stabilizing fins to maintain it in the required orientation. It is also possible to supply power to the transmitting device by a cable from the ship.

The display device on the trawler may, as is well known, include a cathode ray tube, pen recorder, or any other device giving an indication of the reception of fish echoes. The display device may include any of the known circuits for modifying the echo signals to provide special forms of display, see for example U.S. Patent No. 3,098,210 of S. C. Sparling et al., issued July 16, 1963, or for counting the echo signals as in U.S. Patent No. 3,145,363 to R. W. G. Haslett, issued August 18, 1964, and in particular, when trawling is carried out close to the sea-bed, may include provision for delaying the received fish echo signals until receipt of the bottom echo signal and then displaying the fish echoes in relation to the bottom echo as described in U.S. Patent No. 3,119,091 of P. R. Hopkin, et al., issued January 21, 1964. For mid-water trawling, an object capable of giving reliable echoes may be attached to the lower edge of the trawl mouth to provide a reference echo signal equivalent to the bottom echo signal in conventional trawling. Alternatively, the fish echoes may be displayed in relation to a signal received directly from the transmitting device, the latter being, if necessary, modified to direct a weak beam upwards towards the receiving transducer. This is a cheaper and less elaborate method since no delay devices are required and is applicable to both bottom and mid-water trawling.

The amplitude of the direct beam must be very small if it is not to obscure subsequent fish echoes and acoustic curtains may be used in front of the transmitting device to ensure this or the shape of the transducer may be modified to give a beam with a sharply-defined front edge. It is also possible to avoid masking of fish echoes by the direct pulse if this pulse is made to have very sharply-defined edges, but this involves the provision of additional circuits on the trawl head-line.

Figure 2:
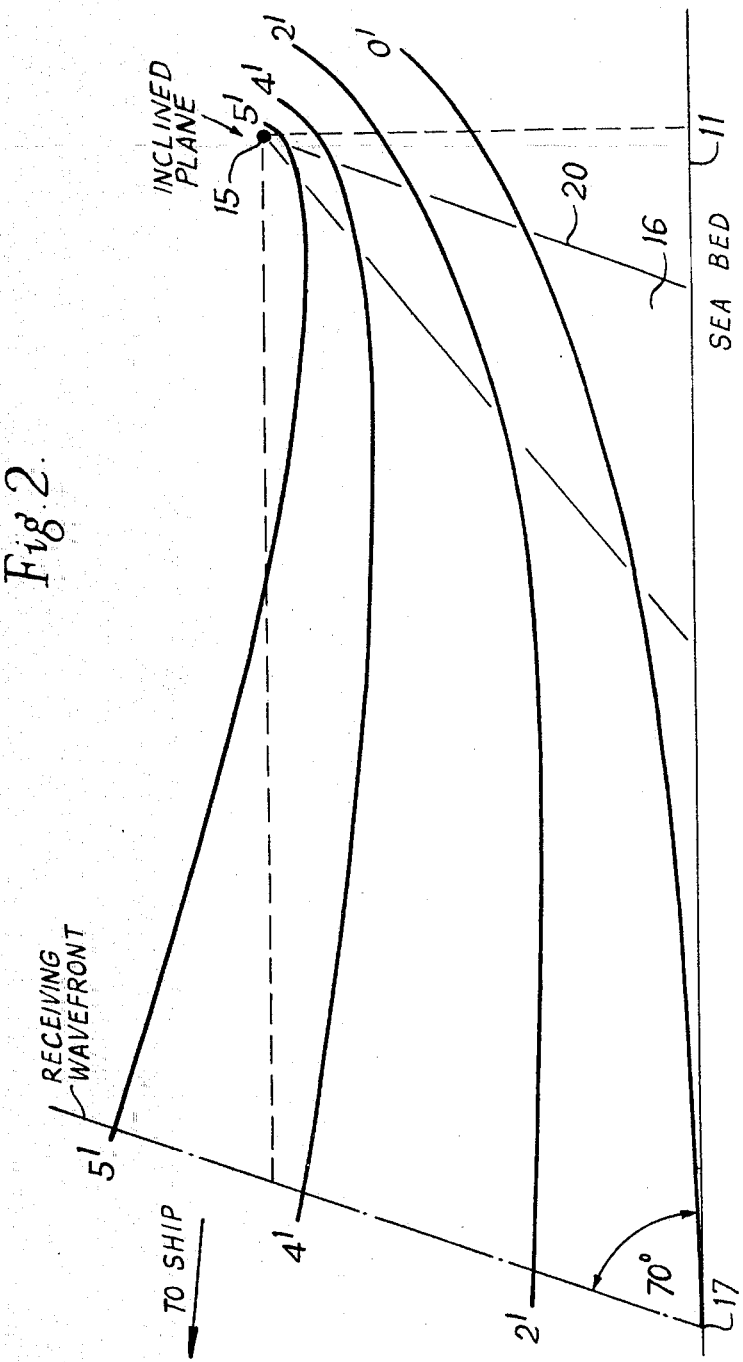
Figure 3:
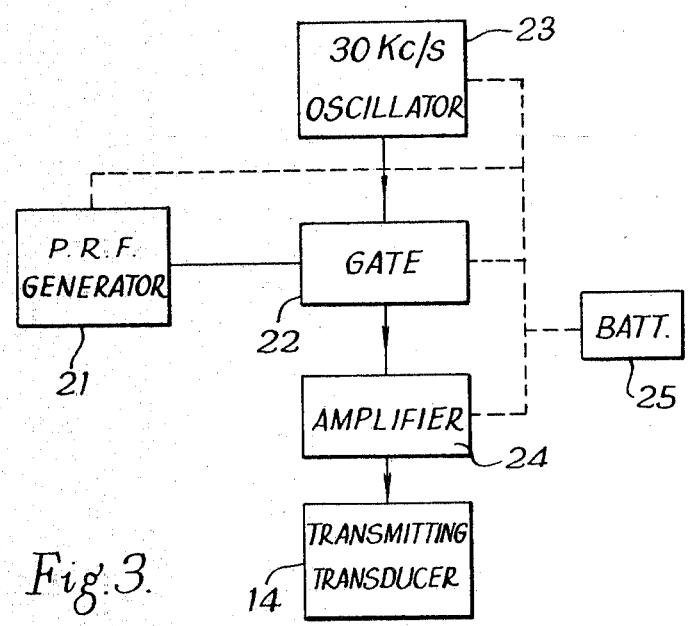
Figure 4:
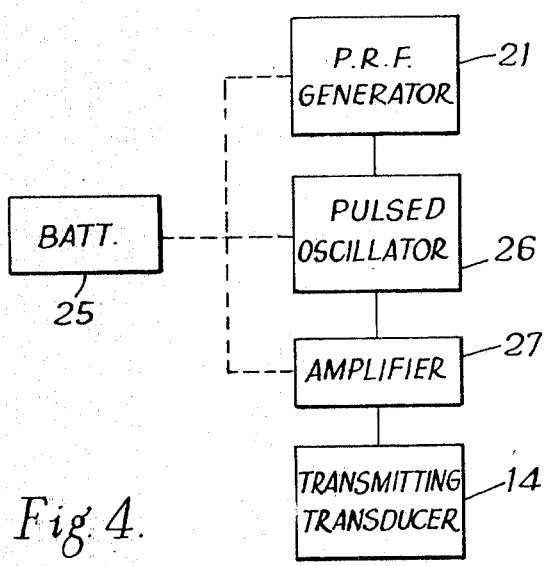
Figure 5:
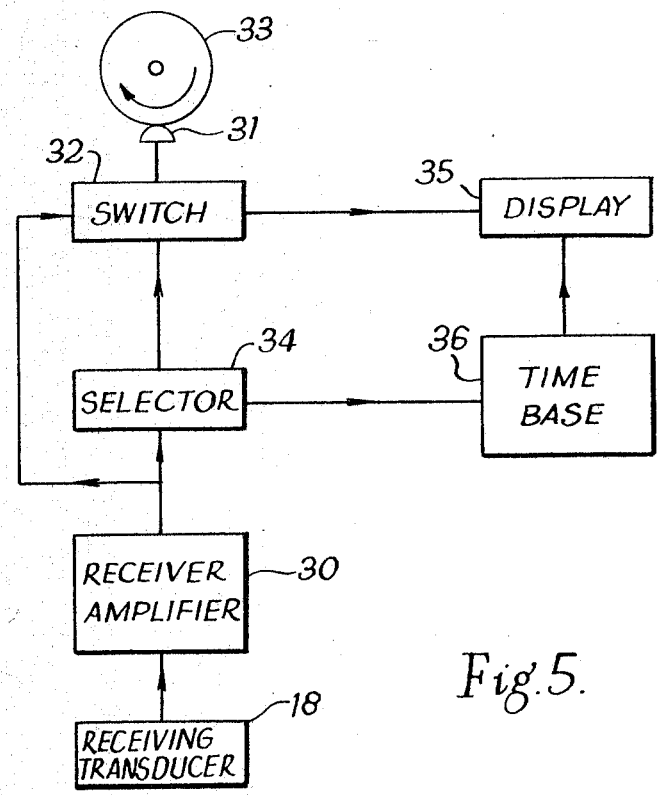

A preferred embodiment of the invention will now be described with reference to the accompanying drawings in which FIG. 1 is a diagram illustrating the disposition of the transmitting device on the trawl net and the receiving transducer when carrying out sea-bed trawling, FIG. 2 is a diagram on an enlarged scale of the region in front of the trawl net showing contours of equal path length, FIG. 3 is a block circuit diagram of the transmitting device, FIG. 4 is a block circuit diagram of an alternative form of transmitting device, and FIG. 5 is a block circuit diagram of the receiving transducer and the display device.

Referring to FIG. 1, a trawl net 10 is drawn over the sea-bed 11 by warps or drag lines 12 attached to a ship 13. A transmitting device 14 is attached to the headline 15 of the trawl 10 and directs a sounding beam 16 downwards in front of the trawl mouth. The limits of the beam 16 as shown in the drawings are arbitrary, the angle of the beam usually being measured to the half-power points, and sufficient power is radiated outside these limits to produce a sea-bed echo from the point 17 on the sea-bed which gives the shortest path length, corresponding to specular reflection, for energy from the transmitting device received by a receiving transducer 18 attached to the trawler 13 after reflection from the sea-bed 11. On the other hand, only the echoes from fish which are received when the fish lie within the beam 16 are strong enough to be recorded by the display device 19 on the trawler to which the receiving transducer 18 is connected.

The receiving transducer 18 is of conventional construction and is mounted to receive echo signals approaching it from a direction approximately parallel to the drag line 12.

In FIG. 1 two possible positions of the receiving transducer are shown at 18 and 18'. The transducer 18 is carried on the warps 12 about 100 feet from the ship in order to remove it from the region of aeration produced by the ship's propeller. The transducer 18' is carried directly by the hull of the ship and is again placed in such a position that the aeration is as small as possible.

In trawling, the warp or drag line by which the net is attached to the vessel is typically of a length equal to about three times the depth of the sea in which trawling is being carried out. The warp is thus inclined at an angle of about 20° to the sea bottom. The receiving transducer is arranged to face approximately along the warp towards the net. The shortest path to the receiving transducer for wave energy from the headline transmitter reflected from the sea-bed or bottom is that corresponding to specular reflection with angles of incidence and reflection of about 70°. The point 17 on the bottom, from which this reflection occurs, is directly in front of the net in a vertical plane containing the transmitting and receiving transducers. Since this gives the shortest path length, the first bottom echo to be received comes from this point. Bottom echos from points in front of, behind, or to either side of this point arrive later and are masked in the display by the trailing edge of the first bottom echo.

The first echos to be received from each transmitted pulse are fish echoes from fish lying within the beam just below the head-line. Further fish echoes are received from points more remote from the transmitter and are followed by the bottom echo from the point 17. FIG. 2 shows curves connecting points for which the path length from the transmitter to the point and thence to the receiver is the same. The figures on these curves represent the apparent height above the sea-bed of the fish from which echoes are received. It will be seen that echoes from fish lying close to the sea-bed and within the beam will be received at the same time as or later than the bottom echo from the point 17 and all fish echoes from below the 0' contour will be masked by the bottom echo. The extent of this loss in the display can be reduced by inclining the sounding beam further forward towards the point 17 and it will be noted that fish at a given height which later come below the 0' contour are above the contour when they enter the front of the beam so that only those very close to the sea-bed will be missed entirely.

It can be seen from FIG. 2 that anything recorded as lying under the 5' contour will pass into the net, the height of which is represented by the height of the head-line 15 above the sea-bed. The relationship between the measured path length and the actual height above the sea-bed is approximately independent of the height of the trawl head-line, but the height of the head-line must, of course, be known in order to determine which fish will enter the trawl. The relation between path length and actual height is altered by a change in the angle of the warps but this change can be calculated and allowed for.

In a transverse plane intersecting the plane of FIG. 2 in the line 20 defining the rear limit of the beam, the contours of equal path length are circles centered on the transmitter. The effect of this curvature is small and is reduced by the use of a narrow beam.

The transmitting device on the trawl head line consists of a transducer, a pulse generating circuit, and batteries for energizing the circuit to apply electrical impulses to the transducer, which generates corresponding pulses of pressure wave energy which are transmitted as a sounding beam. The elements of the transmitting device are enclosed in a watertight casing and attached to the headline of the trawl net so that during trawling the sounding beam is transmitted from a point at the upper boundary of the mouth of the net. The casing has stabilising fins to maintain the transmitting device in the desired orientation.

A block diagram for the transmitting device is shown in FIG. 3. A pulse repetition frequency generator 21 formed by a multivibrator with a period of 0.6 second controls a gate 22 to pass pulses of waves from a 30 Kc./s. oscillator 23 through an amplifier 24 to the transmitting transducer 14.

The circuits of the transmitting device are supplied with power from a battery 25.

An alternate circuit diagram is shown in FIG. 4. Here the pulse repetition frequency generator 21 directly controls a pulsed oscillator 26 whose output is fed through a power amplifier 27 to the transmitting transducer 14.

The received fish echo signals are delayed and the arrival of the sea-bed echo from the point 17 is used to trigger their display. In this way the fish echoes are always displayed relative to the sea-bed independently of the height of the vessel above the sea-bed.

FIG. 5 is a block circuit diagram of one arrangement which may be used for this purpose. For further details and for alternative arrangements reference may be made to U.S. Patent No. 3,119,091 mentioned previously and the specifications of the other patents referred to above. The signals from the receiving transducer 18 are passed to an amplifier 30 whose output is applied to a recording/reproducing head 31 through a switching control circuit 32 to record the echo signals on a magnetic drum 33. The output of the amplifier 30 is also applied to an amplitude selection circuit 34 which only passes signals above a given amplitude. The fish echo signals are rejected by the selection circuit 34 but on arrival of the bottom echo signal this is passed to the switching circuit 32 to switch from recording to reproduction, and the reproduced signals are applied to a display apparatus 35 such as a cathode ray tube. The bottom echo signal from the selection circuit 34 also triggers a time base circuit 36 controlling the display apparatus 35.

The display device uses exactly the same circuits as would be used if the transmitter were on the trawler instead of on the net. To provide additional information it is possible to include a transmitter and receiver on the vessel which operate at a different frequency, say 20 Kc./s. instead of 30 Kc./s., and to apply the signals from both systems to the same display equipment.

As an alternative to locking the display to the bottom echo, it may be locked to a signal from the trawl head-line. When a pulse of wave energy is sent out by the transmitter the signal received directly from the transmitter is arranged to trigger the time base of a display device for the display of the subsequently-arriving fish echoes and bottom echo. In this way the display clearly shows the position of the fish in relation to the trawl head-line and the sea-bed.

Because of the inclination of the sounding beam to the sea-bed a higher pulse repetition rate can be used than is usual for transmitters carried on the vessel, without any risk of confusion in the display resulting from bottom re-echoes, that is echoes of energy first reflected from the surface of the sea.

I claim:

1. Fish detection echo sounding apparatus for use in trawl fishing including a transmitting device capable of generating a sounding beam of pulsed pressure wave energy, means attaching the transmitting device to the trawl adjacent the trawl mouth to direct the beam downwards and forwards in front of the trawl mouth, a receiving transducer for receiving echoes of the sounding beam from fish in front of the trawl mouth, means attaching the receiving transducer to the trawler to position the receiving transducer forward of said transmitting device in the direction of trawling, and a display device on the trawler connected to the receiving transducer to display the received echoes.

2. Apparatus as claimed in claim 1 in which the transmitting device is self-contained.

3. Apparatus as claimed in claim 1 in which the display device includes means for delaying fish echo signals relative to a bottom echo signal and means responsive to the bottom echo signal to initiate display of the delayed fish echo signals.

4. Apparatus as claimed in claim 3 in which the delay means include a magnetic drum for recording the echo signals and the means responsive to the bottom echo signal include a switching circuit and an amplitude selection circuit connected between the receiving transducer and the switching circuit, the switching circuit being arranged to ititiate reproduction from the magnetic drum when a bottom echo signal is passed to it by the amplitude selection circuit.

References Cited by the Examiner

UNITED STATES PATENTS

| | | |
|---|---|---|
| 1,483,547 | 2/1924 | Hayes. |
| 2,821,805 | 2/1958 | Kunze _____ 43—17.1 |
| 2,853,824 | 9/1958 | Schutz _____ 43—17.1 |
| 3,119,092 | 1/1964 | Edgerton _____ 340—3 |

FOREIGN PATENTS 1,322,922    2/1963    France.

OTHER REFERENCES

Bowers: "A High-Power, Low-Frequency Sonar For Sub-Bottom Profiling," J. British I.R.E., vol. 25, May 1963, p. 457 relied on.

CHESTER L. JUSTUS, *Primary Examiner.*

R. A. FARLEY, *Assistant Examiner.*